2,957,859
PURIFICATION OF POLYOLEFINS

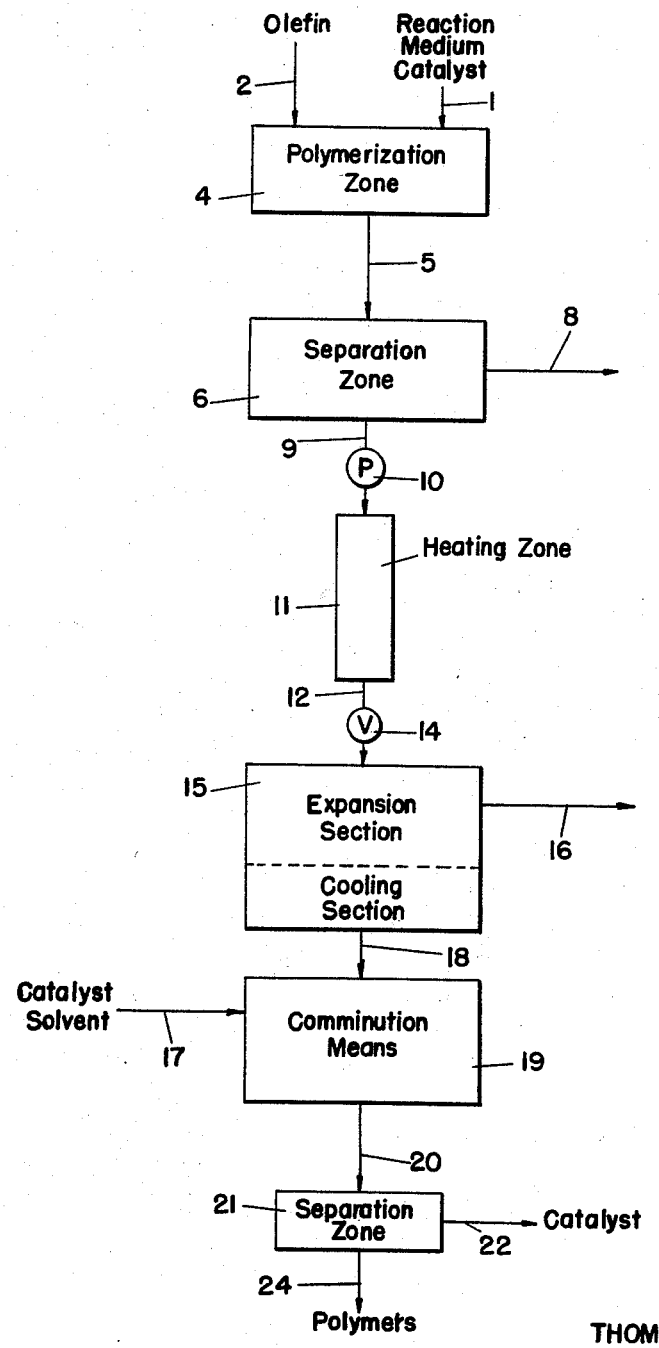

Thomas S. Mertes, Wilmington, Del., assignor to Sun Oil Company, Philadelphia, Pa., a corporation of New Jersey Filed Nov. 13, 1957, Ser. No. 696,215

5 Claims. (Cl. 260—93.7)

This invention relates to the production of solid, high molecular weight polymers from normally gaseous olefins such as ethylene, propylene and mixtures thereof. More particularly, it is directed to a novel method of treating such polymers containing solid particulate polymerization catalyst dispersed therein, whereby removal of the catalyst is greatly facilitated.

Continuous and batch processes employing a solid particulate catalyst in the liquid phase polymerization of normally gaseous olefins to produce solid polymers are known in the art. Generally these processes are carried out by contacting the olefin with the solid, particulate catalyst in the presence of a substantially inert volatile liquid reaction medium in which the olefin is soluble. Reaction conditions are maintained to keep the system in the liquid state and promote the desired degree of polymerization. A substantial yield of solid, high molecular weight polymers is produced, along with a smaller yield of lower molecular weight, liquid or "oily" polymers. The polymerization product is removed from the polymerization zone as a viscous slurry consisting of solid polymers and catalyst suspended in liquid polymers and medium. Unfortunately, not all of the catalyst particles can be separated from the solid polymers by simple separation means such as, for example, filtration or centrifugation. A substantial proportion of the catalyst particles is intimately associated with, and dispersed throughout, the solid polymer product. The separation of this residual catalyst is extremely difficult. Means heretofore employed for attempting such separation involve mechanical comminution or pulverizing steps to subdivide the polymer-catalyst admixture to expose the catalyst particles. Comminution is generally performed in the presence of a catalyst deactivating material, and is accompanied or followed by extraction of the deactivated catalyst from the comminuted polymers. Mechanical means for subdividing the polymer-catalyst admixture are inefficient, and such methods as now practiced are generally unsatisfactory in that removal of a major proportion of the residual catalyst is extremely difficult to achieve.

Thus, one object of the present invention is to provide an improved process for the production of solid, high molecular weight polymers of normally gaseous olefins comprising liquid phase polymerization in the presence of a solid, particulate catalyst. Another object of the invention is to provide a novel method of treating solid high molecular weight polyolefins containing dispersed solid catalyst particles and reaction medium whereby the removal of such catalyst particles is greatly facilitated. A further object is to provide a novel and improved method for subdividing solid, high molecular weight polyolefins containing dispersed reaction medium and catalyst particles. These and other objects and advantages of the invention will become more readily apparent from the following detailed description of the invention, to be read in conjunction with the accompanying drawing, which is a flow diagram illustrating an improved polymerization process embodying the instant invention.

According to the invention, solid polyolefins containing dispersed liquid medium and solid catalyst particles are heated to a temperature which is above the critical temperature of the dispersed liquid medium, and which is also sufficiently high to cause either melting of the solid polymers to a viscous liquid, or at least an appreciable softening of such polymers. The dispersed reaction medium is thereby converted to the gaseous state. During or after such heating, the heated polymers are caused to expand by expansion of the dispersed gaseous medium, whereby the apparent volume of the polymers is substantially increased and their apparent density substantially decreased. The resulting hot "expanded" polymers have a cellular or "foamed" texture which, when captured by cooling to harden the polymers, renders the expanded polymers easier to comminute than the more dense noncellular polymers.

Attention is now directed to Figure I which illustrates the improved process of the invention. A dispersion of solid, particulate polymeriztaion catalyst in a substantially inert, volatile, liquid reaction medium is introduced through line 1 into polymerization zone 4. A normally gaseous olefin, or a mixture of such olefins, is introduced into polymerization zone 4 through line 2. The olefin may be introduced as a gas, or more preferably as a solution of the olefin in the liquid medium. In polymerization zone 4, conditions are maintained to polymerize the olefin to solid polymers of high molecular weight. The reaction mixture, consisting of a slurry, in liquid medium, of solid polyolefins containing dispersed catalyst particles and liquid medium, is withdrawn through line 5 and introduced into separation zone 6 wherein the liquid phase and free catalyst particles, if any, are separated from the solid polymers as completely as possible by conventional means such as centrifugation, filtration, washing, settling, etc. The separated liquid phase is withdrawn through line 8 for further processing and recovery (not shown). When a particularly viscous reaction mixture is produced whereby only a small amount of liquid medium can be separated by the above described means, the separation step in zone 6 can conveniently be omitted. The separated solid polyolefins, containing both catalyst particles and volatile liquid medium dispersed therein, is withdrawn through line 9 and introduced, by transfer means 10, into heating zone 11. In zone 11, the polymers are heated to a temperature which is above the critical temperature of the entrapped liquid medium, and which is sufficient to melt or appreciably soften the polymers. The heated polymers are withdrawn from zone 11 through line 12 and caused to expand suddenly in zone 15 after a controlled reduction in pressure across restricting means 14. The polymers can also be allowed to expand more gradually, as during heating, by omitting restricting means 14. The hot expanded polymers will then collect in zone 15. The former procedure is preferred. The cellular, or "foamed," texture of the hot polymers is then captured by cooling, such as in the lower portion of zone 15, to cause hardening of the polymers. The vapors of the volatile reaction medium which escape from the expanded polymers are withdrawn from the expansion section of zone 15 through line 16, and can be condensed and recovered for reuse (not shown). The cooled expanded polymers are then transferred through line 18 to comminution means 19 wherein the polymers are pulverized by conventional means such as grinding, shredding, etc., in the presence of a catalyst solvent, introduced through line 17. The comminuted polymers and solution of catalyst in catalyst solvent are withdrawn through line 20 and introduced into separation zone 21, wherein the catalyst solution is separated by conventional means, such as filtration or centrifugation, and withdrawn through line 22. Finely-divided polymers substantially free of catalyst are withdrawn through line 24. As an alternative, the expanded polymers containing dispersed catalyst particles can be comminuted in the absence of any added catalyst solvent. In the latter case, finely-divided polymers and catalyst are withdrawn through line 20 and separated by conventional means in zone 21. Finely-divided catalyst is withdrawn through line 22 and the comminuted polymers, substantially free of catalyst, are withdrawn through line 24. The latter alternative is generally not preferred, since it does not permit as complete a removal of the catalyst.

The method of the instant invention represents a substantial improvement over other methods heretofore practiced in the art. Comminution of the polymers is greatly facilitated by reason of the cellular structure of the expanded polymers, and a more complete removal of dispersed catalyst particles is attainable.

It is within the scope of the present invention to produce solid high molecular weight polymers or copolymers of normally gaseous olefins having terminal unsaturation, i.e., having at least one terminal double bond. Such olefins are commonly referred to as alpha-olefins. Propylene is a preferred olefin to employ in the process of the invention and excellent results are obtained therewith. Other alpha-olefins, and mixtures thereof, which can be employed include ethylene, isobutylene, butene-1 and butadiene-1,3. The olefinic monomers can be derived from any source such as, for example, petroleum refinery gas streams, the dehydration of alcohols, and the like. The polyolefins to which this invention is directed have molecular weights in the range of from about 5000 to about 1,000,000, and usually from about 50,000 to about 350,000.

Solid, particulate polymerization catalysts which are insoluble in the volatile liquid reaction medium are used. By solid polymerization catalyst is meant a catalyst which is in particulate form, or a catalyst which is extended upon a particulate carrier. A preferred type of catalyst consists of halides and salts of the metals of groups IV, V and VI of the periodic table. Preferably, a halide or salt of titanium, zirconium, hafnium, vanadium, niobium, chromium, molybdenum or tungsten is used. The metal of the metal compound is preferably in a valence state other than its highest valence state. The reduction of a metal compound such as titanium tetrachloride can be accomplished by any convenient means. An aluminum alkyl can be used as the reducing agent, or other reducing means such as contacting the metal compound with a dispersion of an alkali metal in an inert solvent can be used. It is also necessary that an activator such as aluminum trialkyl be present as a component of the catalyst, and it is convenient in many instances to employ such a compound as both the reducing agent and the activator. However, the use of a prereduced compound such as $TiCl_3$ or $TiCl_2$, together with an activator, gives excellent results. Materials which can be used as the activator, in addition to aluminum trialkyls, include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results and are preferred, but metal alkyls having up to about 12 carbon atoms in the alkyl groups can be used with good results. Alkali metal alkyls such as n-butyllithium, methylsodium, butylsodium, phenyl isopropyl potassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like.

Other suitable solid catalyst systems can be employed as for example: an oxide of a metal of subgroup Va of the periodic table (e.g., an oxide of vanadium, columbium or tantalum) preferably on a support, and used either alone or in combination with an alkali metal aluminum hydride or an alkali metal borohydride; an oxide of a metal of subgroup VIa of the periodic table (e.g., an oxide of chromium, molybdenum, tungsten or uranium), preferably on a support, and used either alone or in combination with a metal borohydride (e.g., an alkali metal borohydride), an alkali metal or the carbides of certain metals (viz., $CaC_2$, $SrC_2$ or $BaC_2$); a metal of group VIII such as nickel cobalt, and nickel-cobalt mixtures extended on an activated carbon support, either alone or in combination with a metal borohydride (e.g., an alkali metal borohydride).

Any of a number of supports can be used for extending the foregoing catalysts. For example, activated alumina, titania, zirconia, silica gel, kieselguhr, diatomite, silica, alumina, silica-alumina composites, alumino-silicates or activated carbon can be so employed.

In practicing the invention, the particle size of the solid catalyst is not critical and good results can be obtained over a wide range of particle sizes. Generally, however, particle sizes smaller than that corresponding to 20 mesh (U.S. Sieve Series) will be employed.

The quantities of the catalytic components can also be varied and good results obtained. A mole ratio of metal salt, or halide, to activator of from 1:10 to 10:1 gives satisfactory results when the metal compound is prereduced or is reduced in situ by the activator. The total quantities used are preferably such that a readily agitatable light slurry of catalyst particles in the liquid reaction medium is obtained. Generally, from 1 part of catalyst to from 25 to 1,000 or more parts of liquid medium gives good results. By "parts" as used herein is meant parts by weight unless otherwise indicated.

According to the present invention, the volatile liquid which is employed as the reaction medium is a hydrocarbon or mixture of hydrocarbons which is liquid and substantially inert under polymerization reaction conditions, and which has a critical temperature below about 650° F., and preferably not higher than 600° F. Various classes of normally-liquid hydrocarbons can be so employed. For example, paraffinic and isoparaffinic hydrocarbons such as the pentanes, hexanes, heptanes, octanes and nonanes give good results, as do cycloparaffins such as cyclopentane, methylcyclopentane, cyclohexane and methylcyclohexane. Mixtures of homologues, and of compounds from different classes can be used. The reaction medium can also be an aromatic compound such as benzene, toluene, and mixtures thereof with each other and with paraffins, isoparaffins and cycloparaffins. The liquid reaction medium also serves as a solvent for the normally gaseous olefin, or olefins, and should exhibit good solvent properties with respect thereto at the concentrations desired.

The polymerization step is conveniently accomplished at temperatures of from about 32° F. to 360° F. and pressures of from about atmospheric to 1,000 p.s.i.g. (pounds per square inch gauge) or more but, if desired, subatmospheric pressure can be employed. The pressure should be sufficient to maintain the polymerization system in the liquid state. With respect to individual catalyst systems which can be employed, certain conditions must be maintained. For example, when the combination of a lower chloride of titanium and an aluminum trialkyl such as aluminum triethyl is used as the catalyst, anhydrous and oxygen-free conditions are essential during the polymerization step. Special conditions necessary for employing other solid catalyst systems can be readily determined.

The polymerization product, as removed from the reactor, generally consists of a slurry, in liquid medium, of solid polymers containing dispersed catalyst particles and liquid medium. Any free catalyst particles and liquid medium are generally removed by means such as filtration. The resulting polymer mass generally contains, intimately dispersed throughout, from about 0.05 to about 0.5 weight percent of residual catalyst particles, and from about 50 to about 95 weight percent of liquid medium.

As described hereinbefore, in practicing the invention the polyolefins containing dispersed catalyst particles and liquid reaction medium are heated to a temperature above the critical temperature of the liquid medium and sufficiently high to at least appreciably soften the polymers. Any convenient method and rate of heating may be employed, and maintenance of the heated polymers at the prescribed temperature for any particular length of time is not critical. It is essential only that the prescribed temperature be maintained long enough to achieve the desired degree of expansion.

Also, as heretofore mentioned, the expansion step can be conducted simultaneously with, or subsequent to, the heating step. In practicing the former embodiment, the polyolefins can be allowed to expand gradually, as in the heat exchanger during heating, and the hot expanded polymers collected prior to cooling. Alternatively, the polymers can be heated under increased pressure and allowed to expand suddenly, through a pressure reducing means such as a valve, into a receiver where the polymers expand prior to cooling. Considerable variation in the resultant degree of polymer expansion can be achieved, as by varying the sequence and/or the manner of conducting the heating and expansion steps.

Following expansion, the hot polymers are cooled to harden the expanded polymers, thereby capturing their cellular structure. Such cooling can be effected by conventional means such as, for example, by direct contact with an inert gaseous coolant, or by quenching in a liquid coolant. After cooling, the expanded polymers are in a preferred condition for comminution. The comminution step can conveniently be performed by any of the means commonly used in the art. Mechanical means will normally be employed, such as, for example, grinding, shredding, attrition, etc. The comminution step is preferably conducted in the presence of a catalyst solvent. The catalyst is thereby dissolved and can be readily separated by means such as filtration. Alternatively, the comminution step can be conducted in the absence of any added catalyst solvent, and the pulverized polymer-catalyst admixture can be subsequently treated to effect complete removal of the catalyst. Such treatment can be by a physical method such as, for example, by gravity separation, or chemical deactivation and extraction, as above described, can be practiced.

The catalyst solvent employed will depend upon the nature of the solid catalyst. Generally aqueous or alcoholic solutions of mineral acids are used. For example, aqueous or alcoholic solutions of hydrochloric, nitric and sulfuric acids are satisfactory. A preferred catalyst solvent for use when the catalyst is a titanium halide is a dilute alcoholic solution of nitric acid such as, for example, 10% by weight nitric acid in methanol or isopropanol.

In order to illustrate a specific embodiment of this invention, a catalyst slurry consisting of 1.65 parts of titanium trichloride particles and 1.28 parts of aluminum triisobutyl to about 68 parts of n-heptane was introduced into an agitated polymerization reactor. Propylene gas was then introduced into the reactor to a pressure of about 120 p.s.i.g. (pounds per square inch gage). The polymerization reaction was continued, with agitation, for a period of 8.1 hours while the temperature was maintained within the range of from 130° F. to 150° F. During this time, the pressure was maintained within the range of from 100 to 120 p.s.i.g. by periodic addition of propylene gas. After 8.1 hours, methanol was introduced into the reactor with continued agitation. The reaction mixture, consisting of a slurry of solid polymers and catalyst in n-heptane, methanol, and oily polymers was then withdrawn and the liquid phase separated by decantation. After decantation, the polymer mass consisted of about 152 parts of solid polypropylene and about 152 parts of n-heptane, the solid polypropylene having an average molecular weight of 156,000 and consisting of about 80% boiling-heptane-insoluble material. The polymer mass also contained about 0.1% by weight of dispersed catalyst particles. This polymer is slowly heated in an open vessel to a temperature of about 520° F., which is above the critical temperature of n-heptane (viz., 513° F.). The polymers are allowed to expand without restraint during heating until the apparent density of the "foamed" polymers is approximately 3 pounds per cubic foot, or slightly more than 1/20 of the absolute density of the "unfoamed" polymers. After cooling to a temperature of about 75° F., the expanded polymers are mechanically comminuted in the presence of a solution of 10% by weight nitric acid in methanol to dissolve the pulverized catalyst particles. The finely divided solid polymers are recovered by filtration and washing. An analysis of these polymers shows them to be substantially free of detectable quantities of titanium materials, the quantity thereof being at least below about 0.01% by weight.

When other embodiments of the invention are practiced, as herein described, substantially equivalent results are obtained.

The invention claimed is:

1. A method of removing dispersed catalyst particles and volatile inert liquid reaction medium from solid polymers of normally gaseous olefins which comprises: heating the solid polymers containing the dispersed catalyst particles and liquid reaction medium to a temperature in excess of the critical temperature of said liquid reaction medium whereby said liquid reaction medium is converted to the gaseous state; expanding the gaseous reaction medium within the heated polymers to a volume substantially greater than that of the reaction medium in the liquid state to produce expanded polymers having a cellular structure; cooling said expanded polymers to harden said cellular structure; comminuting the hardened expanded polymers containing dispersed catalyst particles; treating the comminuted mixture of polymers and solid catalyst with a catalyst solvent whereby the catalyst is dissolved; and recovering finely-divided solid polymers substantially free of catalyst.

2. Process according to claim 1 wherein said normally gaseous olefin is ethylene.

3. Process according to claim 1 wherein said normally gaseous olefin is propylene.

4. Process according to claim 1 wherein said normally gaseous olefin is butene-1.

5. The method according to claim 1 in which the catalyst particles comprise titanium and aluminum compounds and the polymer is recovered substantially free of titanium and aluminum contaminants.

References Cited in the file of this patent

UNITED STATES PATENTS

| | | |
|---|---|---|
| 2,016,199 | Howald | Oct. 1, 1935 |
| 2,827,445 | Bartolomeo et al. | Mar. 18, 1958 |
| 2,857,369 | Johnson | Oct. 21, 1958 |

FOREIGN PATENTS

| | | |
|---|---|---|
| 533,362 | Belgium | May 16, 1955 |